US006741033B2

(12) United States Patent
Scott et al.

(10) Patent No.: US 6,741,033 B2
(45) Date of Patent: May 25, 2004

(54) HIGH TRANSMITTANCE ALUMINA FOR CERAMIC METAL HALIDE LAMPS

(75) Inventors: Curtis E. Scott, Mentor, OH (US); Mary Sue Kaliszewski, Lyndhurst, OH (US); Charles D. Greskovich, Schenectady, NY (US); Harry M. Laska, Willoughby Hills, OH (US)

(73) Assignee: General Electric Company, Schenectady, NY (US)

( * ) Notice: Subject to any disclaimer, the term of this patent is extended or adjusted under 35 U.S.C. 154(b) by 39 days.

(21) Appl. No.: 09/812,432

(22) Filed: Mar. 20, 2001

(65) Prior Publication Data

US 2002/0171363 A1 Nov. 21, 2002

(51) Int. Cl.[7] .................................................. H01J 5/04
(52) U.S. Cl. ........................................ 313/623; 439/570
(58) Field of Search ................................. 313/623, 570, 313/493, 636, 571, 220, 221, 624; 264/1.21, 85, 65; 501/127, 152, 153, 128, 12, 154, 63, 64; 106/73.2, 55, 4

(56) References Cited

U.S. PATENT DOCUMENTS

| 3,935,495 | A | | 1/1976 | Scott, Jr. et al. | |
|---|---|---|---|---|---|
| 4,033,743 | A | | 7/1977 | Scott, Jr. et al. | |
| 4,122,042 | A | | 10/1978 | Meden-Piesslinger et al. | |
| 4,150,317 | A | | 4/1979 | Laska et al. | |
| 4,174,973 | A | * | 11/1979 | Rhodes et al. | 106/73.2 |
| 4,427,785 | A | * | 1/1984 | Prochaska et al. | 501/128 |
| 4,585,972 | A | | 4/1986 | Hing | |
| 4,633,137 | A | | 12/1986 | Scott et al. | |
| 4,690,727 | A | | 9/1987 | Scott et al. | |
| 4,694,219 | A | | 9/1987 | Hing | |
| 4,704,093 | A | | 11/1987 | Morris | |
| 4,765,820 | A | | 8/1988 | Naganawa et al. | |
| 5,035,246 | A | | 7/1991 | Heuvelmans et al. | |
| 5,487,353 | A | | 1/1996 | Scott et al. | |
| 5,742,123 | A | * | 4/1998 | Nagayama et al. | 313/623 |
| 5,747,402 | A | * | 5/1998 | Wei et al. | 501/152 |
| 5,780,377 | A | | 7/1998 | Wajima et al. | |
| 5,861,714 | A | * | 1/1999 | Wei et al. | 313/625 |
| 6,294,871 | B1 | * | 9/2001 | Scott et al. | 313/636 |
| 6,417,127 | B1 | * | 7/2002 | Yamamoto et al. | 501/153 |

FOREIGN PATENT DOCUMENTS

EP  0 419 847 A  4/1991

* cited by examiner

Primary Examiner—Alex Gilman
(74) Attorney, Agent, or Firm—Fay, Sharpe, Fagan, Minnich & McKee, LLP

(57) ABSTRACT

A high transmittance polycrystalline alumina arc tube for a metal halide discharge lamp is formed by treating an alumina arc tube material having a few percent of closed porosity in a two step process, which provides a high-transmittance arc tube. An initially porous arc tube is formed by extruding or die pressing individual components of the tube from a mixture which includes powdered alumina, assembling the components into an arc tube body, and then partially sintering the components to seal them together. The two step process includes hot isostatic pressing of the partially sintered arc tube and then chemically polishing the surface of the tube. The first, pressing step involves heating the alumina arc tube in an inert atmosphere, such as argon, at a temperature of 1600 to 1900° C. and a pressure of about 700 to 2100 kg/sq.cm. for from about one to three hours. This reduces porosity in the crystalline structure. In the second step, the surface of the tube is immersed in a flux comprising a molten alkali metal borate at moderately elevated temperatures, or coated with a flux material which is heated to form the flux, to remove surface imperfections. The finished arc tube has transmittance values which approach those of single crystal sapphire arc tubes.

17 Claims, 2 Drawing Sheets

US 6,741,033 B2

HIGH TRANSMITTANCE ALUMINA FOR CERAMIC METAL HALIDE LAMPS

BACKGROUND OF THE INVENTION

The present invention relates to high transmittance alumina arc tubes for use in electric lamps. It finds particular application in conjunction with ceramic metal halide arc tubes, and will be described with particular reference thereto. It should be appreciated, however, that the invention is also applicable to other lamp envelopes and shrouds for lamps where high transmittance is desired.

Metal halide lamps have conventionally been constructed of a fused silica (quartz) arc tube containing a fill of a light-emitting metal, such as sodium, commonly in the form of the halide, and optionally mercury. The lifetime of such lamps is often limited by the loss of the metal portion of the metal halide fill during lamp operation due to metal ion diffusion, or reaction of the metal halide with the fused silica arc tube, and a corresponding build-up of free halogen in the arc tube.

Recently, ceramic metal halide lamps having polycrystalline alumina arc tubes have been developed which provide advantages over quartz arc tubes. U.S. Pat. Nos. 5,424,609; 5,698,948; and 5,751,111 provide examples of such arc tubes. Ceramic alumina arc tubes are less permeable to sodium ions than quartz and thus retain the metal within the lamp. They are also able to withstand much higher operating temperatures than quartz arc tubes. While quartz arc tubes are limited to operating temperatures of around 900–1000° C., due to reaction of the halide fill with the glass, ceramic alumina arc tubes are capable of withstanding operating temperatures of 1100 to 1200° C., or higher. The higher operating temperatures provide better color rendering and higher lamp efficiency.

Alumina arc tubes are generally constructed of a number of separate parts. The parts are extruded or die pressed from a ceramic powder mixed with an organic binder. European patent Application No. 0 587 238 A1, for example, discloses a ceramic discharge tube of translucent aluminum oxide. Typically, the parts are tacked together with an adhesive and then sintered to form gas-tight monolithic joints between the components.

Another potential arc tube material for metal halide lamps is sapphire. Sapphire arc tubes have been found to provide improved lamp performances over alumina arc tubes due to increased transmission levels. However, such lamps are expensive due to the cost of manufacturing the monocrystalline sapphire material. There are also problems in sealing of the lamps to prevent loss of the fill material.

Improvements in the transmittance of polycrystalline alumina arc tubes have been found when the arc tubes are chemically polished with an alkali metal borate composition. U.S. Pat. Nos. 4,033,743, and 4,633,137 to Scott, et al. disclose a method of contacting an arc tube body with a molten inorganic borate flux which preferentially dissolves a surface layer of alumina grains. The process does not, however, provide arc tubes with transmittances comparable to sapphire because of microscopic discontinuities, or porous regions, in the arc tube surface. The discontinuities remain, even after polishing, reducing the transmittance of the arc tube.

The present invention provides for an improved ceramic body, such as a metal halide arc tube and method of preparation, which has optical performance characteristics approaching those of sapphire.

SUMMARY OF THE INVENTION

In an exemplary embodiment of the present invention, a method of providing a translucent ceramic body with increased in-line optical transmission is provided. The method includes densifying a ceramic body to form a substantially translucent ceramic body. The densifying process includes heating the ceramic body under a pressure of at least 350 kg/sq.cm. The method further includes physically contacting a major surface of the substantially translucent ceramic body with a molten inorganic flux at elevated temperatures and for a time period sufficient to improve transmittance of the ceramic body. The flux includes an alkali metal borate capable of dissolving the ceramic.

In another exemplary embodiment, an optically transparent densified, sintered polycrystalline ceramic body is provided. The body has a major surface which has been treated with a process which includes heating a ceramic body in an inert atmosphere a pressure of at least 350 kg/sq.cm for a sufficient time to form a substantially translucent polycrystalline ceramic body. The process further includes physically contacting a major surface of the substantially translucent ceramic body with a molten inorganic flux which includes an alkali metal borate capable of dissolving the ceramic at elevated temperatures and for a time period sufficient to improve light transmittance by the ceramic body.

In another exemplary embodiment, a high intensity electric discharge lamp is provided. The lamp includes a discharge vessel which defines a chamber. The discharge vessel is constructed from a polycrystalline material which has been densified by applying sufficient pressure and temperature to reduce pores in the vessel and polished by physically contacting a major surface of the substantially translucent vessel with a molten inorganic flux at an elevated temperature and for a time period sufficient to reduce unevenness in the major surface. The lamp further includes electrodes sealed into ends of the chamber and a fill sealed within the chamber. The fill includes a ionizable medium for initiating and sustaining a discharge.

One advantage of the present invention is that it enables an alumina arc tube with high transmittance to be formed.

Another advantage of the present invention which derives from the ability of the arc tube to transmit light with minimal scattering from the smooth surface and allows for lamps formed from the material to provide a more point source illumination.

Still further advantages of the present invention will become apparent to those of ordinary skill in the art upon reading and understanding the following detailed description of the preferred embodiments.

DETAILED DESCRIPTION OF THE PREFERRED EMBODIMENT

Figure 1:
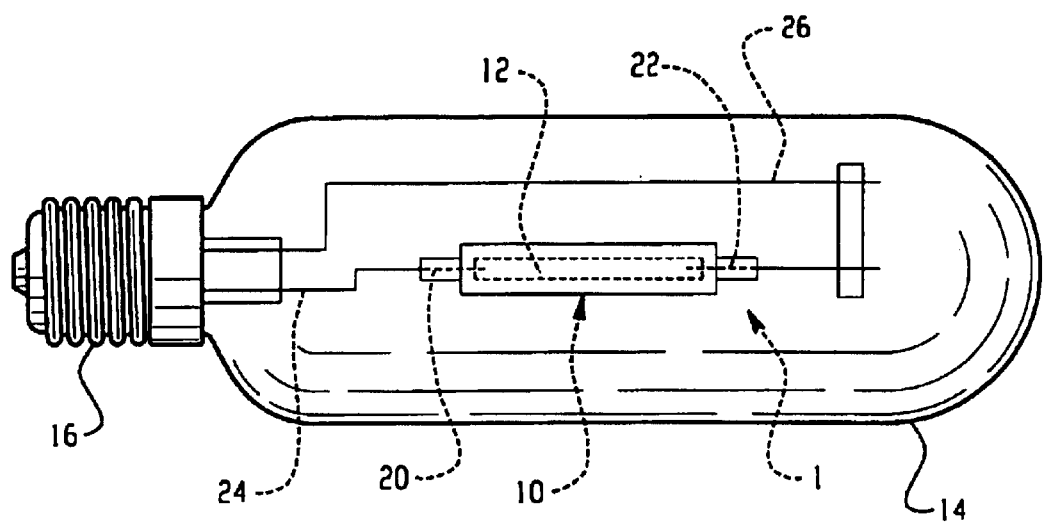
FIG. 1 is a side view of a high transmission metal halide lamp according to the present invention.
Figure 2:
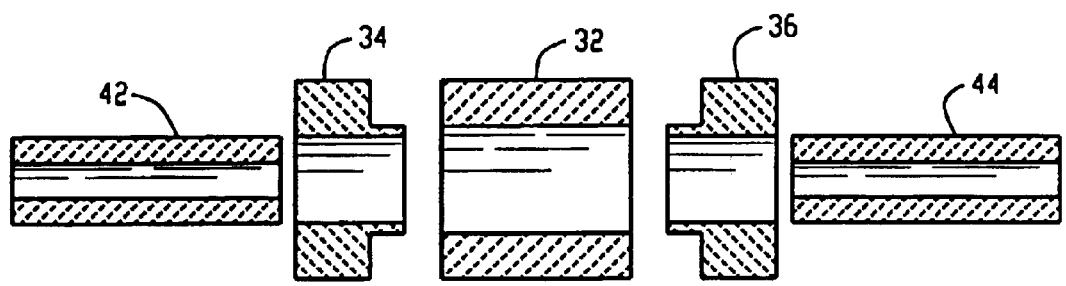
FIG. 2 is a side view of an unassembled ceramic arc tube according to the present invention.
Figure 3:
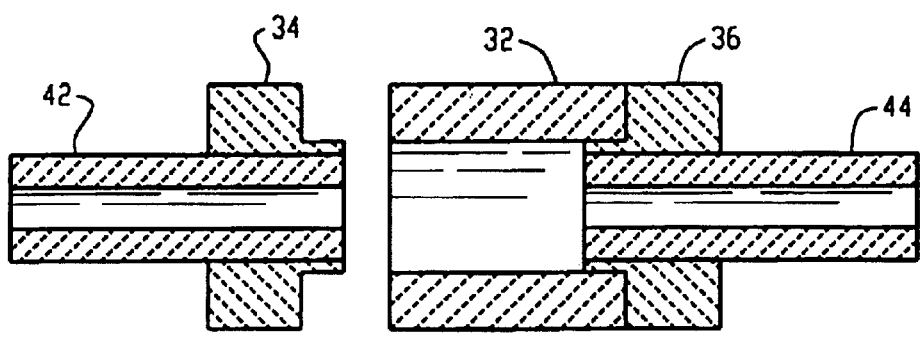
FIG. 3 is an side view of a partially assembled ceramic arc tube according to the present invention.

With reference to FIGS. 1–3, a, high-pressure metal halide lamp is provided with a discharge vessel 1, including a high-transmission arc tube or body 10 which encloses a chamber or discharge space 12. The arc tube has its major surfaces physically and chemically treated to provide increased optical transmission in a manner which will be more fully explained hereinafter.

The discharge space preferably contains a fill which comprises at least one metal halide, such as sodium iodide, thallium iodide or dysprosium iodide, in addition to mercury and a rare gas, such as Argon or Xenon. Other suitable fills, for initiating and sustaining an arc discharge, known in the art, are also contemplated. The discharge vessel is enclosed in an outer envelope 14, which is provided with a lamp cap 16 at one end.

First and second internal electrodes 20, 22 extend into the discharge space 12. The electrodes are formed from tungsten, or other known electrode materials. A discharge forms between the electrodes when the lamp is in an operational state. Current conductors 24 and 26 connect the electrodes 20 and 22, respectively, to first and second electrical contact forming parts of the cap 16. In a preferred embodiment, the current conductors each comprise a niobium lead-in portion 27 welded to a molybdenum portion 28 which, in turn, is welded to the respective tungsten electrode. The molybdenum portion may have an overwind of molybdenum (see FIG. 4).

With particular reference to FIGS. 2 and 3, the ceramic arc tube 10 (not to scale) comprises an outer wall 30, which includes a cylindrical portion 32 with end wall portions 34 and 36 at either end, although other arc tube shapes are also contemplated. Each of the end wall portions defines an opening 38, 40. First and second tubes 42, 44 extend outwardly from the end wall portions 34 and 36, respectively, and are connected to the end walls around the openings. The current conductors 24 and 26 are received by the first and second tubes. The conductors are sealed into the tubes with seals 46 and 48 to create a gas-tight discharge space.

The cylindrical portion, end wall portions and also the first and second tubes are preferably all formed from a polycrystalline aluminum oxide ceramic, although other polycrystalline ceramic materials capable of withstanding high wall temperatures up to 1700–1900° C. and resistant to attack by the fill materials are also contemplated.

Figure 4:
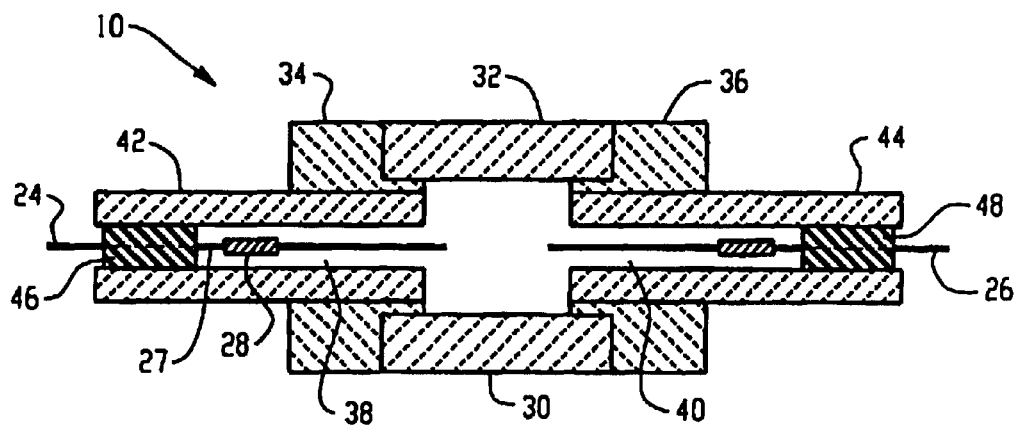
FIG. 4 is a side view of the ceramic arc tube of FIG. 1.

As shown in FIGS. 2–4, the arc tube 10 is readily assembled from separate components, each component corresponding to one of the first and second tubes, end wall portions, and cylindrical portions. The components are fabricated by die pressing or extruding a mixture of a ceramic powder and an organic binder. The components are pre-sintered to about 900–1200° C. in air to remove the organic processing aids. Assembly of the arc tube involves placement and tacking of the components. With particular reference to FIG. 3, the first and second tubes are similarly tacked to the respective end portions with an adhesive and the end portions are tacked to the cylindrical portion. The tacked components are then partially sintered at a temperature of around 1500–1850° C. in $H_2$ to form gas-tight joints. During this sintering, the components shrink to different extents. The differential shrinkage is used advantageously in forming the gas-tight joints. The step of heating in $H_2$ also increases the density of the ceramic material and reduces the porosity but nevertheless leaves the ceramic with some porosity which affects transmission. Alternatively, the arc tube may be formed with fewer or more components. U.S. Pat. Nos. 5,424,609, 5,698,948, and 5,751,111 disclose alternative arc tube bodies which may be used.

The partially sintered $Al_2O_3$ arc tube has a few percent of "closed" porosity, i.e. pores within the arc tube which are not open to the atmosphere, and few, if any, "open" pores. At this stage, the tube is about 90% or more of its final density. The closed pores are typically located at the grain boundaries. The tube preferably has an alumina content of about 99.99%, with magnesia (MgO) present at up to 0.5 weight percent, and preferably at about 400–1500 ppm. The magnesia imparts transparency to the finished tube and ensures that most pores remain on the grain boundaries during sintering. Alternatively, other transparent ceramic oxides, such as $Y_2O_3$, yttrium aluminate, or mullite ($Al_2O_3$-$2SiO_2$) may be used in place of alumina, or a combination of ceramic oxides may be employed.

To form a high-transmittance arc tube, the sintered arc tube is subjected to a two-step process. The first step includes a densifying and/or porosity reducing step process, such as hot isostatic pressing of the arc tube. The second step includes chemically polishing the surface of the tube.

In the first step, the alumina arc tube is heated in an inert atmosphere at a temperature of from about 1600 to 1900° C. at a pressure of about 5000 psi (350 kg/sq.cm.), or greater, more preferably, from about 10,000 to 30,000 psi (700–2100 kg/sq.cm.) for a period of from about one to about three hours. The pressure is preferably held relatively constant (isostatic) during the densifying process. While pressures of around 5000 psi (350 kg/sq.cm.) can reduce porosity, higher pressures are more effective in pore elimination. High pressures are also beneficial if there is residual pressure inside the pores being hot isostatically pressed.

Argon gas provides a suitable inert atmosphere, although other inert gases are also contemplated. The sintered ceramic is converted to a semitransparent polycrystalline aluminum oxide. The pressure eliminates substantially all microscopic porosity which otherwise would reduce the effectiveness of the second, polishing step. The hot isostatic pressing step also strengthens the joints between the components of the arc tube.

During hot isostatic pressing, pores of diameter less than about 5 microns are significantly reduced or eliminated.

Although hot isostatic pressing is a preferred final densifying process, other methods of converting the dense arc tube body unto a translucent ceramic are also contemplated. For example, it is contemplated that the green or partially sintered ceramic body may be contained so that it can be isostatically pressed to translucency in a single step.

In the second step, the outer surface 50 of the arc tube 10 is physically contacted with molten in organic flux that dissolves alumina at a moderate rate until a surface layer has been dissolved to provide a relatively smooth appearance. About 50 microns may be dissolved in this step. It is preferably in carrying out this type of chemical polishing treatment that the flux composition also be selected so as to dissolve the surface layer of the alumina grains preferentially, rather than dissolve any material at the grain boundaries. This provides a surface flattening action. The preferred fluxing agents should also remain stable in the molten condition at elevated temperatures of treatment of up to around 1000° C.

Useful fluxing agents for providing a relatively smooth and flat surface in the foregoing manner are those which do not tend to produce insoluble reaction products at the molten liquid interface which hinder the dissolving process or form an optical scattering surface having poor in-line transmission. The alkali metal borates provide a general class of useful flux compositions demonstrating the abovementioned thermal and chemical stability in a molten state. Preferred fluxing agents from this class are those which are readily removed from the polished surfaces by dissolution in a weak acid or other suitable washing process. In particular, sodium and potassium borates, alone or in combination, provide good fluxing agents. Borates of the general form $(M_2O)_n (B_2O_3)_m$, where M is Na, K, or a mixture of both, and n and m are integers with the ratio of n to m being in the range of from 1:2 to 1:4 are particularly preferred.

The fluxing medium may also contain, in addition to one or more of the borates, a small amount of an alkali metal chloride, such as NaCl or KCl. The chloride is preferably present at a concentration of from about 5–25% and improves removal of the flux after polishing.

To polish the arc tube, it is preferable to carry out the dissolving action in an oxygen containing atmosphere, such as air. In one method, the arc tube is immersed in the molten alkali metal borate or other fluxing agent at moderately elevated temperatures not exceeding approximately 1000° C. This avoids excessive volatilization of the fluxing agent, although the arc tube is capable of withstanding more elevated temperatures if desired. To minimize thermal shock when the treated member is first removed from the molten flux bath it is preferable to return the arc tube to ambient temperature by controlled cooling of the tube, in conventional fashion.

Alkali metal borate fluxes leave a glassy coating on the treated alumina arc tube, which should be removed for optimum in-line transmission. The coating can be dissolved by washing the treated arc tube in a dilute, heated acid solution after it has been cooled.

Alternatively, a glaze polishing method can be used to reduce the surface irregularities. Rather than immersing the arc tube in the molten flux, the flux is produced by coating the arc tube with flux forming materials and then heating to a sufficient temperature to form a flux from the coating. In this method, an alkali borate glass frit can be ground or otherwise formed into a fine powder and formed into a suspension with a suitable carrier liquid, such as methanol. The alkali metal borate is preferably a borate other than lithium borate, with an alkali metal oxide to boron oxide weight ratio in the range of from 1:2 to about 1:4. The frit suspension is applied to the arc tube surface, such as by painting, and then dried to remove all or most of the carrier. The arc tube can then be heated to a sufficient temperature to melt the glazing material, preferably between about 800° C. and 1025° C., for a period of from about 1–2 hours, thereby glazing and polishing the surface.

In one exemplary glaze polishing method, borax, boric oxide, sodium carbonate, and potassium carbonate are mixed. and then heated until melting. The glass material produced is poured into water to produce a frit. The frit is then ground, passed through a screen, and mixed with a carrier, such as a lower alcohol, e.g., methanol or isopropanol. The suspension may further comprise a binder, such as polyvinyl pyrrolidone, and a dispersant, such as glycerol trioleate. The suspension is deposited on an unpolished alumina arc tube and allowed to dry under ambient conditions. The coated alumina tube is then heated to a temperature of between 875° C. and 1025° C. for 30 minutes to 2 hours to melt the coating and create a flux similar to that formed when a bath of molten flux is used and thereby remove a portion of the underlying alumina surface. The polishing residue is then removed by washing the treated tube in a heated dilute aqueous HCl solution. The surface produced, like that produced by flux polishing, is of a generally flat nature, the polishing process having removed high spots on the individual alumina grains without introducing significant low spots at the grain boundaries.

The polished high transmittance ceramic arc tubes produced in this manner show improved optical transmission over conventional polycrystalline alumina arc tubes. Ceramic metal halide lamps fabricated with the high transmittance ceramic tubes have transmittances approaching those of sapphire arc tube lamps and much superior to those of conventional, polycrystalline alumina lamps.

Without intending to limit the scope of the invention, the following examples show how the polished metal halide lamp compares with conventional metal halide lamps and arc stream lamps.

EXAMPLES

Example 1

Hot Isostatic Pressing of Alumina Arc Tubes

Sintered, dense 150 watt ceramic metal halide arc tubes of Lucalox™ were placed into a molybdenum crucible. The crucible was placed into a Conway hot isostatic press and argon introduced at 1000 psi (70 kg/sq.cm.). The arc tubes were heated to about 1750° C. at a heating rate of 12.5° C./min, at which time the pressure was 24,500 psi (1722 kg/sq.cm.), and held at a pressure of about 24,500 psi for 1 hour. After pressing, it was observed that pores of about 5$\mu$ or less were significantly reduced or eliminated. While Lucalox begins showing plasticity or creep at about 1400° C., temperatures in excess of 1600° C. are particularly suited for decreasing porosity.

Example 2

Comparison of Chemically Polished with Unpolished Lamps

Three types of ceramic metal halide lamps (CMH 7009, 700B, and 7001) were prepared. Some of the lamps had arc tubes which were polished by a glaze polishing process, others were left unpolished. The arc tubes for each lamp were first hot isostatically pressed in a heated pressure vessel, as described in Example 1. Then, those arctubes which were to be polished were glaze polished by coating the arctube with a suspension of sodium and potassium borate $[(K_2O) (Na_2O) (B_2O_3)_6]$ in methanol. The coated arctubes were heated to a temperature of about 900° C. This temperature was above the melting point of the glass coating, which was about 850° C., and also above the melting point of the glass coating when some of the alumina has dissolved in the molten glass, which was somewhat higher. The polishing residue is then removed by washing the treated tube in a heated dilute aqueous HCl solution.

The effect of chemical polishing was clearly evident by comparing photographs of the projected image from the polished and unpolished arctubes in lamps. The unpolished arctube, in the operating lamp, appears bright white with no resolved features, while the lamp with the ceramic tube that had been pressed and chemically polished showed the visible plasma.

1) Total Lumen Measurements.

The total output of chemically polished CMH lamps was compared with that of an Arc stream™ lamp (a quartz metal halide lamp manufactured in Europe by General Electric) and a non-polished CMH lamp in a large integrating sphere. The large sphere was calibrated using a three fiber XMH60 source. Lumen measurements were taken from all three fibers using the Graseby optronics 371 integrating sphere. The fibers were then measured individually and simultaneously to ensure the detector in the large sphere was operating within its linear region for the lamp measurements. The detector was read using an ammeter and the calibration factor found using the fiber source. The non-polished CMH lamp and the Arcstream lamp were run at 120.0 VAC, while the voltage of the chemically polished CMH lamps was varied so that they ran at the same total wattage output as the non-polished CMH lamps. The total lumen output for the pressed and polished CMH lamps was greater than for the controls.

2) Aperture Measurements.

All of the lamps tested were placed in turn in a GE MR20-B1 reflector. The Graseby 371 integrating sphere was placed at the focus of the reflector and the lamp position and sphere position were maximized using the CMH 7001 lamp with a 9 mm aperture on the sphere. The non-polished CMH and the Arcstream lamp were run at a 120.0 VAC and the polished CMH lamps were run at the same voltages as for the large sphere measurements.

Lumen measurements were taken with 6, 9, 12, and 17.5 mm apertures. The results are shown in TABLE 1.

TABLE 1

| Aperture Size (mm) | Arcstream Luminous Flux | Old CMH Luminous Flux | Chem pol CMH 7009 Luminous Flux | Chem pol CMH 700B Luminous Flux | Chem pol CMH 7001 Luminous Flux |
|---|---|---|---|---|---|
| 0 | 0 | 0 | 0 | 0 | 0 |
| 6 | 885 | 587 | 691 | 718 | 680 |
| 9 | 1174 | 806 | 922 | 892 | 912 |
| 12 | 1571 | 1070 | 1174 | 1259 | 1058 |
| 17.5 | 2672 | 1942 | 2160 | 2136 | 1974 |

Figure 5:
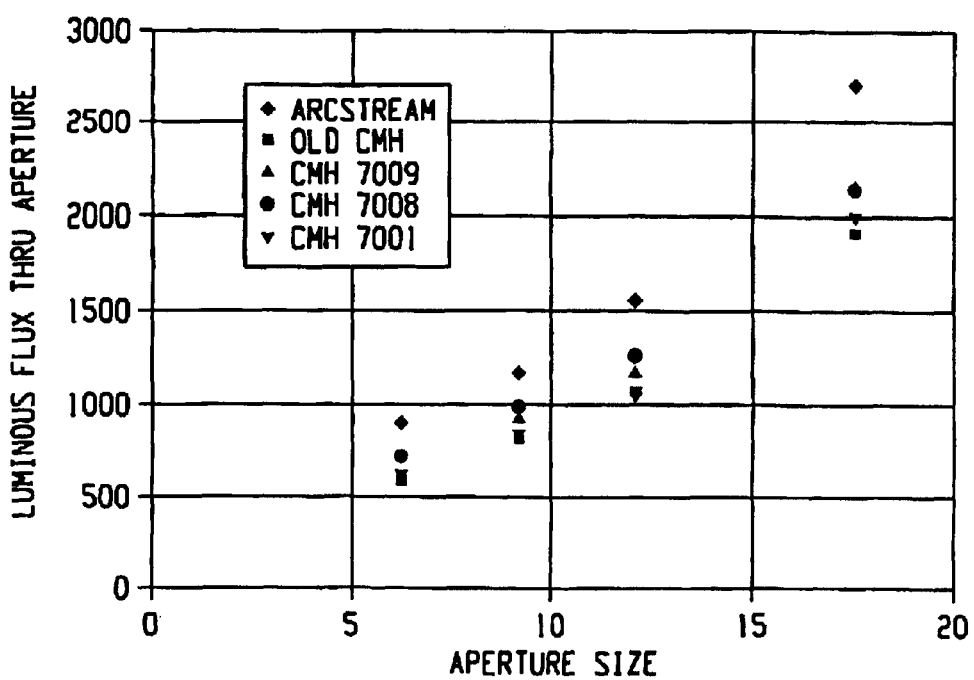
FIG. 5 is a plot of luminous flux through an aperture versus aperture size for unpolished and polished lamps.

FIG. 5 is a plot of luminous flux through an aperture versus aperture size for the five lamp types.

Because the arc length in the CMH lamp is about twice that of the Arcstream lamp, it was not expected that more light would be obtained in a 17.5 mm aperture for the polished CMH than for the Arcstream. However, in the best case, 83% of the light from the Arcstream was obtained using the present chemically polished CMH. Comparing the polished CMH and the normal CMH lamps, a 22% increase in the light into a 6 mm aperture was obtained for the best lamps. CRI was higher in the polished bulb 85a then in the Arcstream 80. The results suggest that reducing the arc length to about 5 mm or less, a CMH lamp could be used for fiber optic applications.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of providing a translucent ceramic body with increased in-line optical transmission comprising:
   (a) densifying a ceramic body to form a substantially translucent ceramic body, the densifying process including heating the ceramic body under a pressure of at least 350 kg/sq.cm. wherein the ceramic body includes about 99.9% alumina and up to about 0.5% magnesia; and
   (b) physically contacting a major surface of the substantially translucent ceramic body with a molten inorganic flux, which includes an alkali metal borate capable of dissolving the ceramic, at elevated temperatures and for a time period sufficient to improve transmittance of the ceramic body.

2. The method of claim 1, wherein the step of physically contacting includes coating the ceramic body with a material for forming the flux and heating the coated ceramic body to a sufficient temperature for melting the material.

3. The method of claim 1, further including after the step of contacting:
   removing flux residue from the major surface by dissolving the flux with an acid solution.

4. The method of claim 1, wherein the ceramic body is an arc tube.

5. The method of claim 1, wherein the step of densifying includes:
   heating the ceramic body in an inert atmosphere at a temperature of from about 1600° C. to 1900° C.

6. The method of claim 5, wherein the step of densifying includes:
   during heating, subjecting the ceramic body to a pressure of at least about 700 kg/sq.cm.

7. The method of claim 6, wherein the step of densifying includes subjecting the ceramic body to a pressure of up to about 2100 kg/sq.cm.

8. The method of claim 1, wherein the step of physically contacting includes immersing the ceramic body in a molten flux bath.

9. The method of claim 8, wherein the step of physically contacting includes immersing the body in a molten flux bath in an oxidizing atmosphere.

10. The method of claim 8, wherein the temperature of the molten flux bath is less than about 1000° C.

11. The method of claim 1, wherein the alkali metal borate is of the general formula $(M_2O)_n(B_2O_3)_m$, where M includes at least one of Na and K and where n and m are integers, and combinations thereof.

12. The method of claim 11, wherein n:m is in the range of from 1:2 to 1:4.

13. The optically transparent densified, sintered polycrystalline ceramic body of claim 12, wherein the body comprises an arctube.

14. An optically transparent densified, sintered polycrystalline ceramic body having a major surface treated with a process comprising:
   heating a ceramic body in an inert atmosphere a pressure of at least 350 kg/sq.cm for a sufficient time to form a substantially translucent polycrystalline ceramic body, wherein the ceramic body includes about 99.9% alumina and up to about 0.5% magnesia; and
   physically contacting a major surface of the substantially translucent ceramic body with a molten inorganic flux which includes an alkali metal borate capable of dissolving the ceramic at elevated temperatures and for a time period sufficient to improve light transmittance by the ceramic body.

15. The optically transparent densified, sintered polycrystalline ceramic body of claim 14, wherein the step of heating includes heating the ceramic body to a temperature of about 1600° C. to 1900° C.

16. The optically transparent sintered polycrystalline alumina body of claim 14, wherein the magnesia is present at a concentration of 400–1500 ppm.

17. A high intensity electric discharge lamp comprising:

a discharge vessel which defines a chamber, the discharge vessel being constructed from a polycrystalline material including about 99.9% alumina and up to about 0.5% magnesia, which has been densified by applying sufficient pressure and temperature to reduce pores in the vessel and polished by immersing a major surface of the substantially translucent vessel in a molten inorganic flux at elevated temperatures and for a time period sufficient to reduce unevenness in the major surface;

electrodes sealed into ends of the chamber; and a fill sealed within the chamber, the fill including a ionizable medium for initiating and sustaining a discharge.

* * * * *